Patented Nov. 1, 1927.

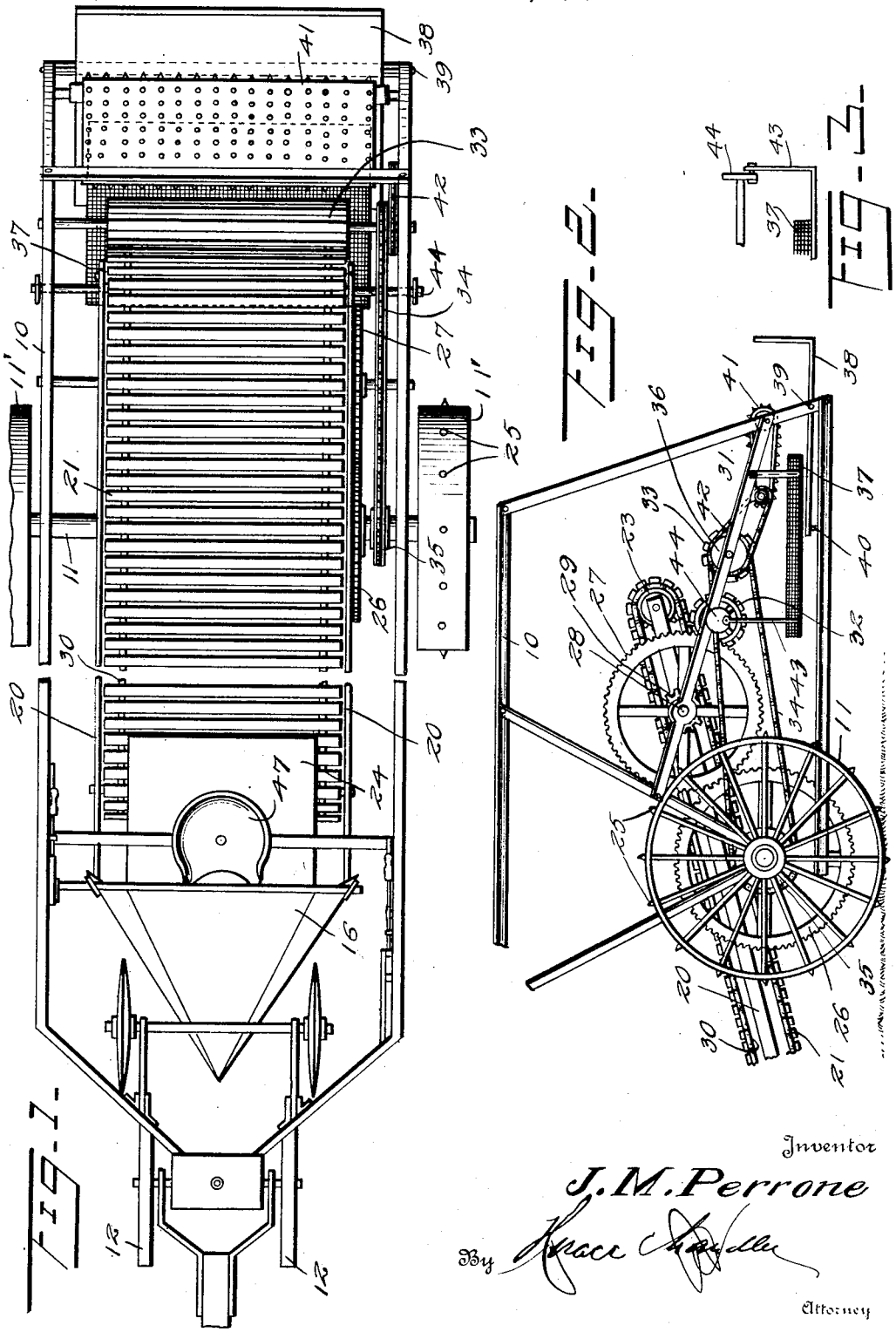

1,647,717

UNITED STATES PATENT OFFICE.

JOHN M. PERRONE, OF STEELES STORE, TEXAS.

CLOD CRUSHER AND GRASS DESTROYER.

Application filed March 12, 1923. Serial No. 624,611.

The object of the invention is to provide a comparatively simple machine which may be operated over weed or grass sown land where the soil is of a quality tending to clod or lump, whereby the soil may be reduced to a condition suitable for seeding, and whereby, at the same time, grass, weeds, and similar growth, may be separated with the roots for removal and destruction.

With this object in view, the invention consists in a construction and arrangement of parts, of which a preferred embodiment is illustrated in the accompanying drawing.

In the drawing:

Figure 1 is a top plan view of a typical form of the machine.

Figure 2 is a side elevation of the rear portion of the machine.

Figure 3 is a fragmentary detail view showing the connections between the link 43 and the disk 44.

The frame 10, in addition to having the axle 11 carrying the main or drive wheels 11', is provided with front supporting wheels 12. Mounted in the forward portion of the frame is a plow 16. Extending rearwardly from the plow 16, is a conveyor frame 20, carrying an endless conveyor belt 21, which traverses the sprocket wheels 23, to so locate the conveyor belt, as to receive the soil lifted by the plow, and delivered by the blade 24, said blade inclining upwardly from the plow, and having its rear edge in overlapping relation to the front end of the conveyor belt. Each of the drive wheels is peripherally roughened, as at 25. The axle 11, inwardly of the frame 10 carries a drive gear 26, which meshes with a drive gear 27, the spindle of which, as indicated at 28, carries a sprocket wheel 29, meshing with the side chain 30, of the conveyor belt 21, to communicate continuous motion to the belt, through the forward movement of the machine. The spindle 28 is preferably mounted in bearings in the braces 31, which are disposed at the rear of the frame 10. The braces 31 also serve as a means for supporting the transverse parallel crushing rollers 32 and 33, between which the conveyor belt 21 discharges the material. The roller 33 receives rotary motion from the axle 11 through a chain 34, traversing a sprocket wheel 35 on said axle, and a sprocket wheel 36, on said roller. The forward roller 32 may be an idler, as shown, although obviously power may be communicated thereto, if found necessary. Beneath the rollers, to receive the discharge therefrom is a screen or sifter 37, through which the reduced soil may be returned to the ground, while the grass, weeds, and roots are separated therefrom and finally dropped over the rear edge of the screen. The separation of the weeds and grass obviously involves the deposit thereof upon the surface from which they may be gathered for destruction, and to provide for this, a cradle 38 is arranged in rear of the screen and mounted to tilt upon an axis 39, on the main frame, a suitable retaining chain 40 being supplied to normally hold the same in position to receive the discharge from the screen. In connection with the cradle, an endless rake 41 is disposed above the screen for actuation from the rear crushing roller, or any other convenient element of the mechanism, through the agency of a belt 42, or its equivalent.

The screen or sifter is preferably suspended for oscillatory or swinging movement by links 43, and is actuated by the cranks 44, or may be driven or rocked by a motor, not shown.

What is claimed is:

A clod crusher and weed destroyer including a digger, a conveyor in position to receive from the digger, crushing rolls disposed in position to receive from the conveyor, depending links eccentrically mounted on the ends of the crushing rolls, a horizontal sifting screen pan suspended on said links in position to receive from the crushing rolls and arranged to be shaken vertically thereby, and an endless raker belt mounted for movement longitudinally above the screen pan and driven by one of said crushing rolls.

In testimony whereof, I affix my signature.

JOHN M. PERRONE.